Feb. 4, 1958  S. E. PETRASEK  2,822,015
SAFETY TIRE CONSTRUCTION
Filed Oct. 6, 1953  3 Sheets-Sheet 1
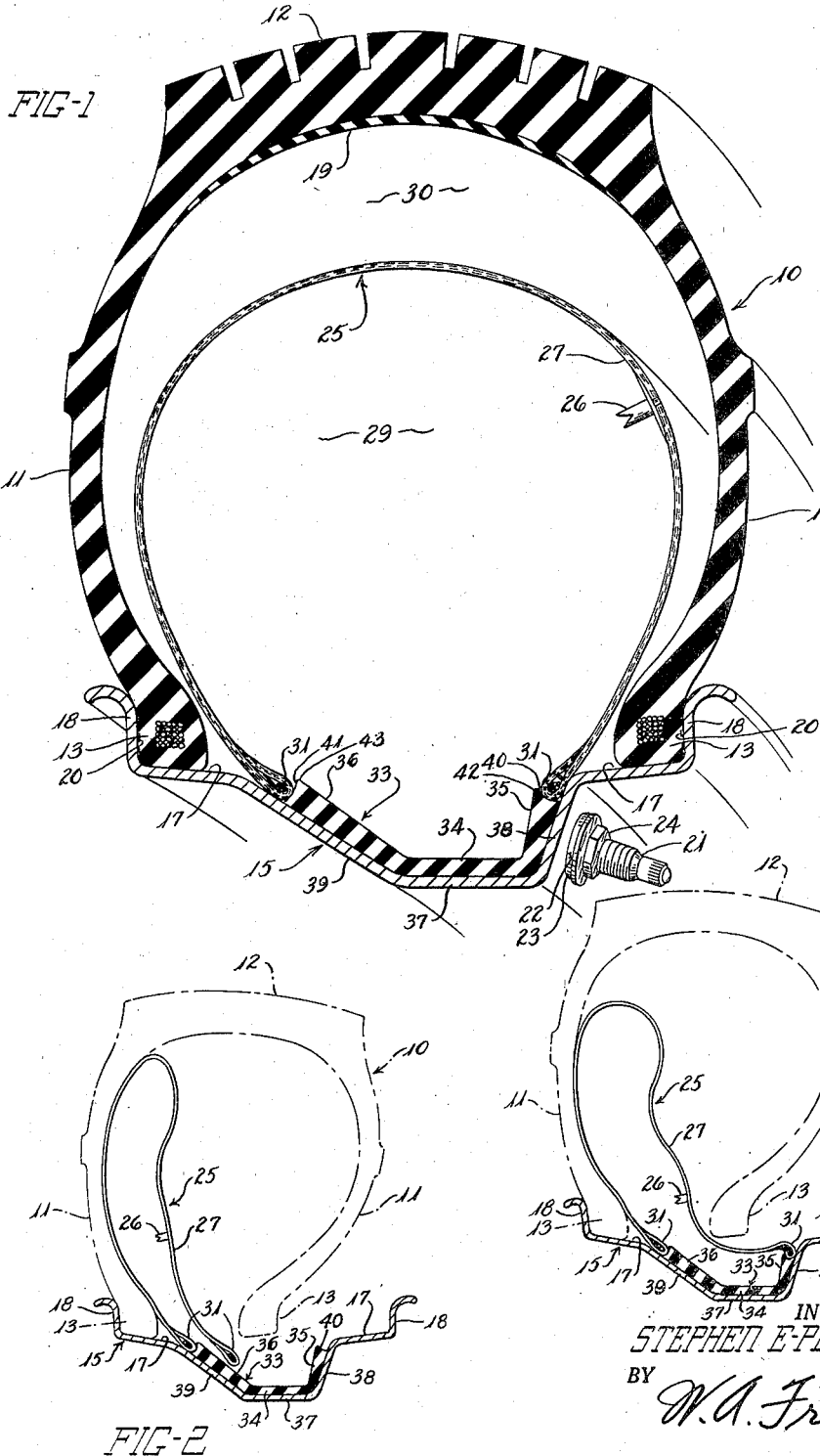
INVENTOR.
STEPHEN E. PETRASEK
BY
W. A. Fraser
ATTY-

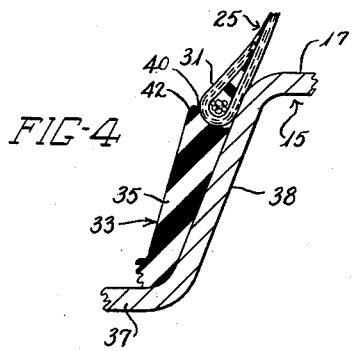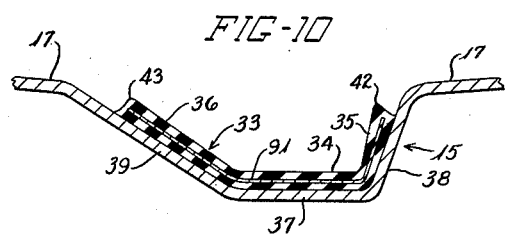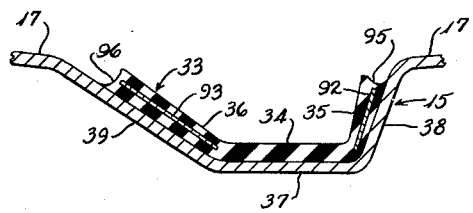

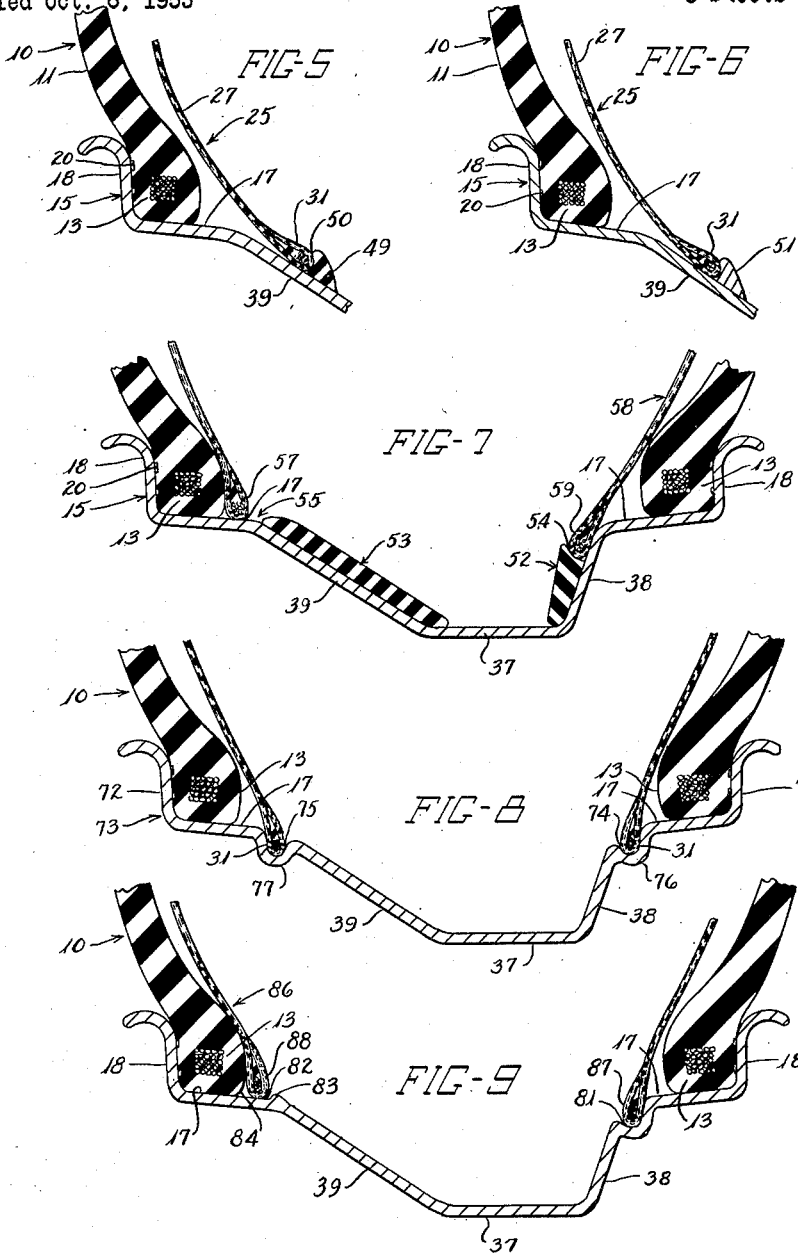

United States Patent Office 2,822,015
Patented Feb. 4, 1958

2,822,015

SAFETY TIRE CONSTRUCTION

Stephen E. Petrasek, Akron, Ohio, assignor to The Firestone Tire & Rubber Company, Akron, Ohio, a corporation of Ohio Application October 6, 1953, Serial No. 384,473

6 Claims. (Cl. 152—341)

This invention relates to tubeless tires and to improved safety members and rims therefor.

The desirability of a safety member to provide blowout protection for tubeless tires has been recognized for many years and various constructions have been suggested. The co-pending application of Frank S. King and William S. Coben, Serial No. 194,129, now Patent No. 2,713,371, discloses one such safety member in the form of a diaphragm having inextensible beaded edges which seat on ledges molded into the tires for that purpose. The King and Coben construction has met with considerable commercial success but it has the objection that it must be used with specially molded tires and is not adapted for use with the ordinary tubeless tires.

The co-pending application of Frank S. King, Serial No. 353,066, now Patent No. 2,754,876, dated July 17, 1956, discloses other forms of safety members which may be used with tubeless tires of conventional construction. The diaphragms disclosed in the King application, like that of the prior King and Coben application, recognize the value of a diaphragm having inextensible beads for such beads enable the diaphragms to be handled easily during the mounting operation and provide a stability of attachment of the diaphragms to a suitable supporting means within the tire which cannot be obtained in any other means. The King application also discloses the advantage of having such supporting means integral with or closely associated with the rim rather than with the tire itself.

The present invention comprises an improvement upon the safety diaphragm constructions disclosed in these co-pending applications by providing means for mounting a diaphragm with beaded edges securely and firmly within a tubeless tire without the necessity of having a specially molded tire. The preferred form of the invention comprises a U-shaped safety member which fits snugly within the well of a drop center rim and which, together with the walls of the drop center well, define a pair of circumferential seats adapted to receive the beaded edges of a diaphragm. The diameter of at least one of the beaded edge of the diaphragm is appreciably smaller than the inside bead diameter of the tire with which it is to be mounted and this difference in diameters permits the tire beads to be pulled axially outwardly over such beaded edge to provide an ease of mounting which is not otherwise attainable. In the modified forms of the invention, the U-shaped member is replaced by seat members for the diaphragm beads which are either integral parts of the rim itself or are separate members secured firmly to the rim. All forms of the invention, however, have the common feature that at least one of the beaded edges of the diaphragm has a diameter appreciably smaller than the diameter of the tire beads in order to provide the desired ease of mounting.

Accordingly, a general object of the present invention is to provide a rim and safety member construction for tubeless tires which enables the safety member to be positioned and held within the tire adjacent the walls of the drop center well of the rim.

Another object is to provide a safety member which is held within the tire in such a manner that it will not shift position and be thrown out of balance during operation of the tire.

Other objects are to provide a safety member which is easy and economical to manufacture and which can be easily handled and mounted.

These and other objects and advantages of the invention will be more fully apparent from the following description of several forms of the invention, reference being had to the accompanying drawings in which:

Figure 1 is a radial section of a tubeless tire mounted on a drop center rim together with a safety member and supporting means embodying the present invention;

Figure 2 is a fragmentary view illustrating an initial step in mounting the assembly of Figure 1;

Figure 3 is a view similar to Figure 2 showing a later step in the mounting of the tire and safety diaphragm of Figure 1;

Figure 4 is a fragmentary view of a portion of Figure 1 showing on an enlarged scale the manner in which the safety member is mounted within the tire;

Figures 5 and 6 are fragmentary views similar to Figure 4 showing, respectively, various modifications of the invention;

Figure 7 is a fragmentary view of a safety diaphragm and supporting means mounted within a tubeless tire and drop center rim, the supporting means being a modification of the means of Figure 1;

Figures 8 and 9 are views similar to Figure 7 showing modifications in which the diaphragm supporting means are integral with the rims;

Figures 10 and 11 are views showing further modifications of the construction of Figures 1 and 7 respectively.

Referring first to Figure 1, the invention is illustrated in association with a tubeless tire 10 of more or less conventional construction, the tire having sidewalls 11, a tread portion 12 and bead portions 13. The tire is shown mounted on a conventional drop center rim, indicated generally at 15, with the beads 13 of the tire seated on the surfaces or seats 17 adjacent the side flanges 18 of the rim. The tire and rim form an airtight enclosure with the air retained within the tire by a lining 19 of an impervious material such as butyl rubber which prevents the air from seeping into and through the carcass of the tire. The tire preferably has ribs 20 adjacent the tire beads which are pressed against the flanges 18 of the rim by the pressure within the tire, thus preventing air from leaking out of the tire at this point.

The tire is inflated by means of an inflation valve 21 which is inserted within a hole 22 in the drop center well of the rim. The connection between the valve and the rim is made air-tight by suitable means such as the rubber washer 23 which is drawn tight against the surface of the rim by a nut 24 threadedly secured to the stem of the inflation valve.

In order to provide blow-out protection, the interior of the tire is divided into an outer and an inner compartment by a safety member or diaphragm indicated generally at 25. Communication between the compartments is provided by a flutter valve 26 inserted in the body portion 27 of the diaphragm. When the tire is inflated the air passes into the inner compartment 29 and through the flutter valve into the outer compartment 30. During inflation the rate of introducing air is usually slow and the flutter valve remains open to provide a free passage of air. However, when a blow-out occurs with an explosive release of air from the outer compartment the flutter valve pinches shut to retain air within the inner compartment 29, and give continued support to the tire, If desired, the flutter valve may be replaced by a suitable slow-leak aperture, not shown.

The body portion 27 of the safety diaphragm preferably comprises two plies of rubberized fabric extending from a point within the drop center well of the rim adjacent one of the bead seats 17 to a corresponding point adjacent the other bead seat. The fabric plies are wrapped around and securely anchored to inextensible wire bead portions 31 which serve to hold the diaphragm in place in the manner now to be described.

According to the invention, the rim has inserted therein a supporting member 33 which is substantially U-shaped in section. The member is adapted to conform snugly to the drop center well of the rim having a base 34 and radial arms 35 and 36 lying against the bottom wall 37 and side walls 38 and 39 of the drop center well, respectively. Preferably, the U-shaped member is molded to shape from a rather stiff rubber and is cemented or vulcanized in place within the rim. Alternatively, the member may be removably secured to the rim by suitable rubber or metal rivets extending through the rim. The circumferential edges of the arms 36 and 37 of the U-shaped supporting member are shaped, as best shown in Figure 4, so as to define circumferential grooves 40 and 41 in conjunction with the side walls of the drop center well. The grooves 40 and 41 have a diameter slightly larger than the diameter of the beaded edges 31 of the diaphragm. The construction is such that the beads 31 can be snapped over the projecting lips 42 and 43 of the U-shaped member and be seated within the grooves with a slight compression fit.

In mounting the assembly of tire, safety diaphragm and supporting member on the rim, the U-shaped member 33 is initially placed within the rim and either cemented, vulcanized or otherwise secured within the drop center well. The diaphragm 25 is placed inside the tire and the loose assembly of tire and diaphragm is mounted over the side flanges of the rim by taking advantage of the drop center well in the usual manner. The left hand tire bead 13 is then manually forced into its proper position upon the left hand rim seat 17 and the adjacent beaded edge 31 of the diaphragm is manually snapped into position within the groove 41. The other tire bead is then forced inwardly to take the position shown in Figure 2. With the tire bead in this position it is possible to reach into the tire and manually pull the other diaphragm bead 31 into position within the groove 40, see Figure 3. It will be noted that when the second diaphragm bead is in mounted position, the diaphragm is collapsed inwardly and the unmounted tire bead has a sufficiently large diameter to pass over the diaphragm bead and move outwardly into position upon its bead seat upon the rim in the usual manner. The outward movement of the second tire bead upon the bead seat may be facilitated by the use of a conventional mounting band which spreads the beads apart by constricting the tread portion of the tire. When the tire beads are in place the tire is inflated in the usual manner. The member 33 is necessarily apertured adjacent the inflation valve so that air can pass freely into the tire. The tire and diaphragm assembly can be dismounted by reversing the mounting steps outlined above.

In another form of the invention the grooves which receive the diaphragm beads may be formed by cementing or vulcanizing ledges 49 of rubber directly to the side walls of the rim in the manner shown in Figure 5. These ledges are appropriately shaped so as to define grooves 50 which are substantially the same as the grooves 40 and 41, of Figures 1–4. In some cases the ledges 49 may be made of plastic. Alternatively, the ledges may take the form of metal rings 51 welded, brazed or otherwise secured to the rim in the desired positions, see Figure 6.

In another form of the invention, see Figure 7, the U-shaped member 33 may be replaced by a pair of separate ring parts 52 and 53. The ring 52 is substantially the same as the arm 35 of the U-shaped member, but the ring 53 differs from the arm 36 in that it extends closely adjacent to and projects slightly beyond the wall 39 of the rim. The ring 52 defines a groove 54 with the wall 38 of the rim and the ring 53 defines a groove 55 with the adjacent tire bead 13. In this modification one of the beaded edges 57 of the diaphragm 58 will have a sufficiently large diameter to seat snugly within the groove 55 and the other beaded edge 59 is smaller in diameter so that it will fit snugly within the groove 54. It is necessary in order to provide ease of mounting, that at least one diaphragm bead, in this case bead 59, have a substantially smaller diameter than the tire beads so that the assembly can be mounted in substantially the same manner already described with respect to the assembly of Figures 1–4.

As shown, in Figure 8, the grooves 74 and 75 are defined primarily by the wall portions 76 and 77 which project at a slight angle to the axis. This angle is such as to hold the beads within the grooves and to prevent them from sliding axially inwardly into the drop center well.

In another form of the invention, the rim itself may have integrally formed seats adapted to receive the beaded edges of the diaphragm, see Figure 8. In this form of the invention the side walls 71 and 72 of the drop center rim 73 are indented as indicated to provide the circumferential grooves 74 and 75 substantially below the level of the bead seats of the rim (as viewed) so that the tire beads 13 can pass freely over the diaphragm beads 31 during the mounting of the tire. The provision of such grooves in no way detracts from but rather adds to the strength and rigidity of the rim. The mounting of the tire and the diaphragm on the rim is accomplished in the same manner as that described for the assembly of Figure 1 above.

In another form of the invention, as shown in Figure 9, two different types of bead seats are shown formed integrally with the rim. Thus the right hand diaphragm groove on seat 81 is similar to the seat 74 of Figure 8 while the left hand seat 82 is defined by a lip 83 at the juncture of side wall 39 with the adjacent bead seat 17 and by the toe 84 of the adjacent tire bead as shown. In this form of the invention the diaphragm 86 is substantially the same as the diaphragm 58 of Figure 7 having beaded edges 87 and 88 of different diameters. The advantage of this construction is that the larger diameter bead 88 is somewhat easier to pass over the side flanges of the rim and the mounting of the diaphragm is thus facilitated.

It will be apparent that various modifications of the invention can be made. For example, the rubber supporting member 33 of Figure 1 can be reinforced by a metal strip 91 molded therein, as in Figure 10, or by two separate strips 92 and 93, see Figure 11. Likewise similar metal inserts can be provided in the parts 52 and 53 of Figure 7. It will be apparent that to provide ease in mounting the metal reinforcing strips should not be continuous circumferentially.

The various supporting members which are associated with the rim have been shown as defining grooves in conjunction with the walls of the rim. The members can, of course, be molded so that the grooves are completely molded into their circumferential edges. For example, see the bead seats 95 and 96 of Figure 11. Moreover, it is preferable that such parts as are not integral with the rim should have sealing contact with the rim to guard against loss of air around and under the diaphragm beads.

Also in order to provide a better seal with the diaphragm beads, the integral seats of Figures 6, 8 and 9 may be provided with a light skim coating of rubber.

Other changes and modifications will no doubt occur to those skilled in the art without departing from the spirit and scope of the invention, the essential features of which are summarized in the appended claims.

I claim:

1. In combination, a drop center rim having a bottom wall, sidewalls defining the drop center well of said rim and tire bead seats connected to said sidewalls respectively, and terminating in side flanges, a tubeless tire having beads positioned on said bead seats adjacent said flanges, means having a pair of radially outwardly facing axially spaced circumferential grooves spaced from and positioned radially inwardly of said tire beads, and a safety diaphragm of relatively inextensible flexible material extending across the interior of said tire in a manner to divide the interior into an outer compartment and an inner compartment, said diaphragm terminating in a pair of circumferential substantially inextensible beaded edges seated firmly within said grooves respectively, said beaded edges having diameters substantially less than the bead diameter of said tire whereby said tire beads can be moved axially outwardly during the mounting of said tire to clear said beaded edges when they are seated in said grooves.

2. The combination of claim 1, in which said means comprises a channel-shaped member adapted to fit snugly within said drop center well of said rim.

3. The combination of claim 2, in which said channel-shaped member comprises a ring of rubbery material bonded to said rim.

4. The combination of claim 1, in which said means are integral with said sidewalls of said drop center well of said rim.

5. The combination of claim 2, in which said grooves are located in the circumferential edges of said channel-shaped member.

6. In combination, a drop center rim having a bottom wall, sidewalls defining the drop center well of said rim and tire bead seats connected to said sidewalls respectively, and terminating in side flanges, a tubeless tire having beads positioned on said bead seats adjacent said flanges, means having a pair of circumferential edges spaced from and radially inwardly of said tire beads defining radially outwardly facing circumferential grooves with the side walls of said drop center well, and a safety diaphragm of rubberized fabric extending across said space in a manner to divide it into an outer compartment and an inner compartment, said diaphragm terminating in a pair of circumferential substantially inextensible beaded edges seated firmly within said grooves respectively, said beaded edges having diameters substantially less than the bead diameter of said tire whereby said tire beads can be moved axially outwardly during mounting of said tire over said beaded edges when they are seated in said grooves.

References Cited in the file of this patent

UNITED STATES PATENTS

| | | |
|---|---|---|
| 1,757,728 | Martin | May 6, 1930 |
| 2,410,209 | Godsey | Oct. 29, 1946 |
| 2,665,732 | Slezak | Jan. 12, 1954 |

FOREIGN PATENTS

| | | |
|---|---|---|
| 686,145 | Great Britain | Jan. 21, 1953 |